Figure 1:
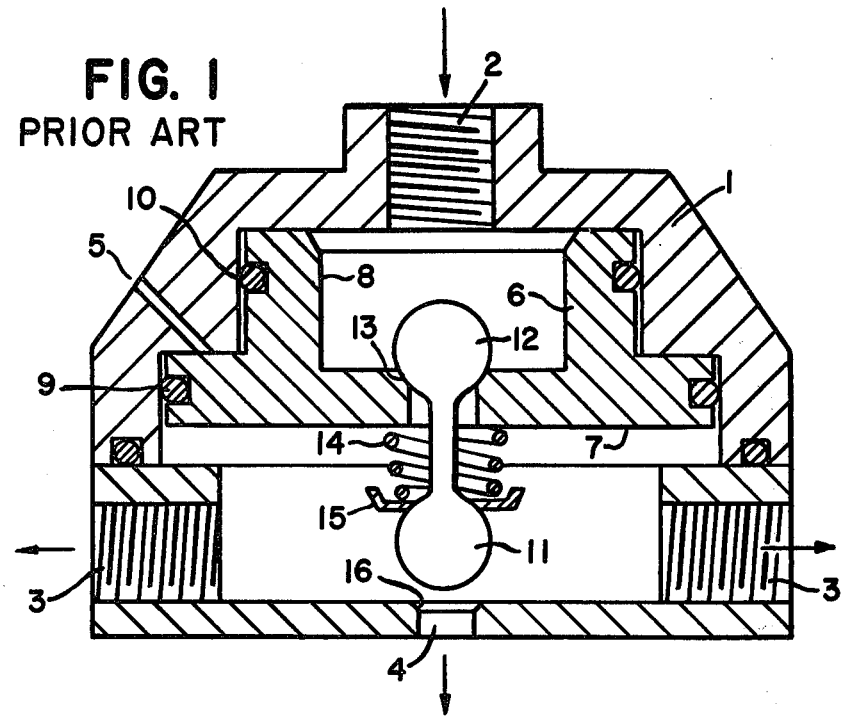

United States Patent [19]

Lippiatt

[11] 4,438,980
[45] Mar. 27, 1984

[54] PROPORTIONING VALVE WITH PRESSURE PORT COMMUNICATING WITH STEPPED AREA OF DIFFERENTIAL PISTON

[75] Inventor: Sidney A. Lippiatt, Bath, England

[73] Assignee: Bendix Limited, Bristol, England

[21] Appl. No.: 361,162

[22] Filed: Mar. 23, 1982

[30] Foreign Application Priority Data

Mar. 27, 1981 [GB] United Kingdom ............... 8109772

[51] Int. Cl.³ .............................................. B60T 15/18
[52] U.S. Cl. .................................... 303/6 C; 137/102; 303/28
[58] Field of Search ............... 303/6 C, 6 R, 28, 29, 303/30, 40, 22 R, 22 A; 188/349, 195; 137/627.5, 102; 91/422

[56] References Cited

U.S. PATENT DOCUMENTS

| 3,002,520 | 10/1961 | Morse | 137/102 |
| 3,259,439 | 7/1966 | Bueler | 303/40 |
| 3,302,982 | 2/1967 | Pekrul | 137/102 X |
| 3,429,621 | 2/1969 | Bueler | 303/40 X |
| 3,718,372 | 2/1973 | Gruner et al. | 303/40 X |
| 3,769,997 | 11/1973 | Hardwick et al. | 137/102 |
| 4,145,089 | 3/1979 | Reinecke et al. | 303/40 X |
| 4,300,805 | 11/1981 | Reinecke | 303/40 X |

FOREIGN PATENT DOCUMENTS 2018843 10/1971 Fed. Rep. of Germany ........ 303/40

Primary Examiner—Douglas C. Butler
Attorney, Agent, or Firm—Ken C. Decker; W. N. Antonis

[57] ABSTRACT

A pressure reducing valve is constricted with a stepped piston affording a pressure responsive area on one side responsive to the pressure at an output port and a smaller pressure responsive area on the other side, contained between the seals of the two piston diameters and responsive to the pressure at an input port, the piston carrying a self lapping valve assembly connected via a passage to the smaller area for controlling the pressure at the output port in relation to that at the input port.

4 Claims, 2 Drawing Figures

U.S. Patent     Mar. 27, 1984     4,438,980

PROPORTIONING VALVE WITH PRESSURE PORT COMMUNICATING WITH STEPPED AREA OF DIFFERENTIAL PISTON

This invention relates to a pressure proportioning valve and relates especially but not exclusively to a pressure proportioning valve for reducing pressure to brake actuators of a compressed air braking system.

In compressed air braking systems for road vehicles it is often required to present different brake pressures to brake actuators of front and rear axles and in order to achieve this a pressure proportioning valve is used to supply actuators of the front axle with a proportion of the pressure applied to the rear axles or vice versa. One form of such a proportioning valve can comprise a dual piston carrying a self-lapping valve one side of which piston is subject to fluid pressure at an input port and the other side of which piston is of larger area and subject to the fluid pressure at an output port which is supplied with fluid pressure from the input port via the self-lapping valve. The self-lapping valve is arranged to close when equilibrium is created across the piston and to open a path from the delivery port to exhaust if the delivered pressure tends to exceed a predetermined proportion of the pressure at the input port. Since the piston has two diameters it requires two seals and the volume between the seals is preferably vented via a separate vent port to atmosphere.

The present invention seeks to provide an improved construction of a pressure proportioning valve which inter alia does not require such a separate vent port.

According to the present invention there is provided a pressure proportioning valve having a housing and a self-lapping double valve operable to connect a delivery port to an input port or to a vent and having a stable lap position with a predetermined ratio of fluid pressures at the input port and delivery port, said double valve being carried by a double piston having portions of different areas slidable in respective cylindrical portions of the housing and wherein the pressure at one said port acts upon an area defined between said seals and the pressure at the other said port acts opposingly thereon on the piston.

Figure 2:
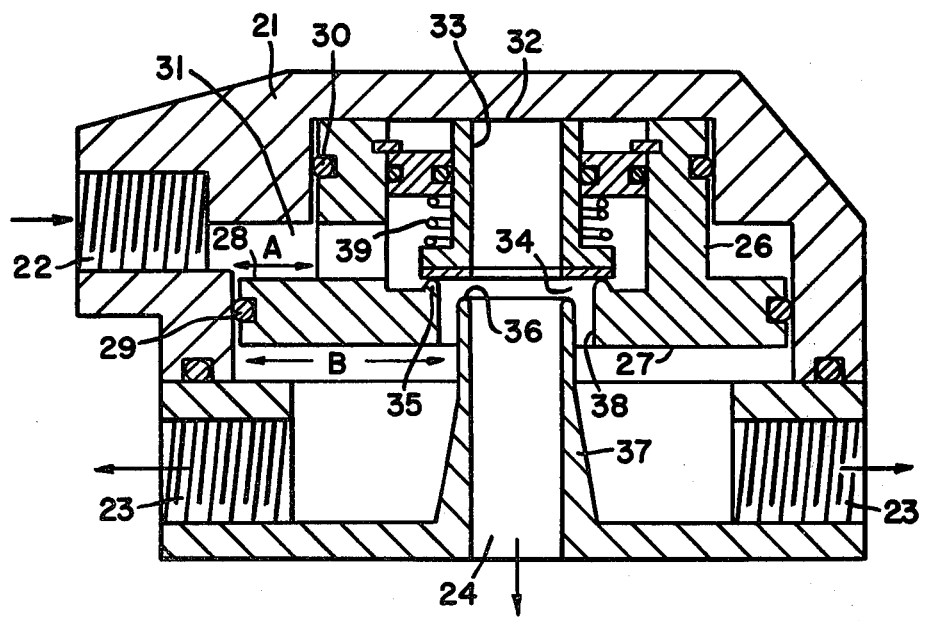

In order that the invention may be more clearly understood and readily carried into effect, the same will be further described by way of example with reference to the accompanying drawing of which:

FIG. 1 illustrates in diagrammatical form a prior known arrangement of a pressure proportioning valve FIG. 2 illustrates in diagrammatical form a pressure proportioning valve employing the present invention.

Referring to FIG. 1, the pressure proportioning valve has a main housing denoted by reference 1, having an input port 2 a pair of delivery ports 3, and exhaust port 4 and an additional vent port 5. Sealingly moveable within the housing there is provided a stepped double piston 6 having on the underside thereof an area 7 which communicates with with the delivery ports 3 and which is larger than the effective area 8 on the other side of the piston which communicates with the input port 2. The two portions of the piston are provided with separate seals 9 and 10 the region between the seals 9 and 10 being vented via the above mentioned additional vent port 5. The piston carries a self-lapping double ended valve arrangement with respective ends 11 and 12, the end 12 being urged into engagement with a valve seat 13 by a spring 14 retained between the piston and the retaining cup 15. On downward movement of the piston the lower end of the valve member is engageable with an exhaust valve seat 16 to close off the connection between the delivery ports and the exhaust port. Further downward movement after the stabilisng effect of spring 14 is then effective to unseat the end 12 from the seat 13 thereby providing communication between the inlet port and the delivery port.

In operation of the arrangement of FIG. 1, with all ports vented the rest position is as shown. When fluid pressure is applied to the inlet port 2, the double piston 7 moves downwards to carry the double valve member towards the exhaust valve seat 16 to then close the exhaust passage and thereafter unseat 12 from 13 to thereby provide communication from the inlet port to the delivery ports. The delivery port pressure thus increases and upon attainment of a fluid pressure at the delivery ports which is in a reduced proportion to the inlet port pressure predetermined in accordance with the approximate ratio of the areas 8 and 7, the piston 7 returns upwards to a position where the double valve laps with seats 13 and 16 closed. If the pressure at the delivery ports increase sufficiently beyond the predetermined proportion sufficiently to overcome the lap stability provided mainly by spring 14 the valve end 11 unseats from the seat 16 and venting of the delivery port pressure occurs until stable equilibrium is regained. By providing the additional vent at 5, any leakage which occurs across the seal 10 or the seal 9 is vented to atmosphere. If such leakage is only small, its does not therefore affect the operation of the proportioning valve. However, this relies upon the vent 15 not becoming blocked with extraneous matter such as road grit, etc., and it will be seen that in the improved arrangement of FIG. 2 the risk of such a vent becoming blocked is over-come.

Referring to FIG. 2, this again has a main housing 21 an inlet port 22, a pair of delivery ports 23 and an exhaust port 24. A piston 26 has an area 27 (generated by dimension B) subject to the pressure at the delivery ports and an annular area 28 (generated by dimension A) subject to pressure at the inlet port. The area 28 is of appreciably less area than the area 27 the ratio being such as to determine the the approximate proportioning ratio of the valve. The larger diameter portion of the piston has a seal 29 and a smaller diameter portion of the piston has a seal 30 separating a region 31 which is at input port pressure from a region 32 which is always at exhaust port pressure. Carried within the piston 26 there is a sealingly slideable tubular valve member 33 with a closure surface 34 which is engageable with either or both of seat 35 formed in the piston and seat 36 formed on a tubular upstand 37 communicating with the exhaust port 24. The upstand 37 is so engageable by extending upwardly through a central aperture 38 in the piston and the valve member 33 is urged against the seat 35 by a housed spring 39. A passage 40 in the wall of piston 26 provides a path to the valve from region 31.

In operation of the arrangement shown in FIG. 2, fluid pressure applied at the inlet port 22 is effective on the smaller area 28 of the piston 26 to tend to move the piston downwards to cause the closure surface 34 to engage with seat 36 to close off the exhaust port and further downward movement causes the member 33 to be sealingly moved in the piston to unseat the surface 34 from the seat 35 thereby providing a communication between the inlet port 22 via region 31 and passage 40 to delivery ports 23. Upon attainment of the predetermined proportion between the pressures at the inlet port 22 and the delivery ports 23, the valve arrangement comprising closure surface 34 and seats 36 and 35 are lapped together thereby closing off the delivery port both from the exhaust port and the inlet port. Any tendency for the delivered pressure to increase beyond the predetermined proportion of the pressure of the inlet port, to an extent to overcome the stability afforded by spring 39, causes a piston assembly to move upwards thereby briefly opening the delivery port to the exhaust port to permit partial venting to re-establish equilibrium.

In the event of the seal 30 leaking, since this seal is now located to separate a region 31 at inlet port pressure from a region 32 at exhaust port pressure at all times, such leakage if only small does not affect the operation of the proportioning valve. Further, in the event of the seal 29 exhibiting a similar small leakage, overcharging at the delivery ports is prevented by the above mentioned lifting of the piston to permit venting of the excess pressure to the exhaust 4.

It is therefore seen that not only is the improved arrangement a compact and convenient arrangement to manufacture but also a need for an additional vent path for venting a region between the two seals of the pressure responsive member is avoided.

A typical application of the pressure proportioning valve described above with reference to FIG. 2, is to provide a predetermined ratio of braking pressure to brake actuators of a heavy road vehicle fitted with air brakes or air over hydraulic brakes. In such an application the air pressure for operating the brakes on a front axle may be applied also to the input port 22 of the proportioning valve and the pressure for controlling the rear brakes may then be derived from delivery ports 23 so that rear axle braking pressures are a predetermined proportion of front axle braking pressures.

Whilst in accordance with the example of the proportioning valve described above in accordance with the invention the area of the pressure responsive member between the seals (seals 29 and 30) thereof is designed to be less than the opposing area, so that ports 23 are used as delivery ports for pressures fed in at port 22 between the seals an alternative example may be readily envisaged. In such alternative the area between the seals may be larger than the opposing area and the self-lapping double valve rearranged so that the input pressure is applied to the said opposing area allowing the reduced delivered pressure to be derived from the region between the seals.

Such an arrangement may have similar advantages to FIG. 2 in the regard to the possibility of minor leakage around the seals.

I claim:

1. A pressure proportioning valve having a housing having a pair of opposite ends, said housing having an inlet port, an outlet port, and an exhaust port, a piston slidable in said housing, said piston being stepped to define larger and smaller portions with a shoulder therebetween, first sealing means sealing the smaller portion of the piston with the wall of said housing to define a first chamber between one end of said housing, said smaller portion of the piston and said first sealing means, said first chamber being communicated with said exhaust port, second sealing means sealing the larger portion of the piston with the wall of said housing to define a second chamber between the other end of said housing, said larger portion of the piston, and said second sealing means, said second chamber being communicated to one of said inlet and outlet ports, said shoulder cooperating with the wall of said bore and said first and second sealing means to define a third chamber separated from said first chamber by said first sealing means and from said second chamber by said second sealing means, the other of said inlet and outlet ports communicating with said third chamber, and a double valve assembly including a valve member carried by said piston and responsive to movement thereof to control communication between said chambers, the effective area of said piston responsive to the pressure level in said third chamber being less than the effective area of said piston exposed to the pressure level in said second chamber, said double valve assembly having a stable lap position to maintain a predetermined pressure ratio between said second and third chambers.

2. A pressure proportioning valve as claimed in claim 1, wherein said inlet port communicates with said third chamber and said outlet port communicates with said second chamber.

3. A pressure proportioning valve as claimed in claim 2, and spring means urging said double valve assembly toward a condition closing communication between the second and third chambers.

4. A pressure proportioning valve as claimed in claim 3, wherein said double valve assembly includes a valve seat engageable by said valve member, said valve member having a passage communicating with said exhaust port, said second chamber being communicated with said exhaust port when the valve member is moved away from said valve seat.

* * * * *